United States Patent Office 3,377,165

Patented Apr. 9, 1968

3,377,165

PROCESS OF COPYING UTILIZING A BLUSH LACQUER COATING AND A PHOTODECOMPOSABLE PROGENITOR OF A PLASTICIZER

Wesley R. Workman, St. Paul, Minn., assignor to Minnesota Mining and Manufacturing Company, St. Paul, Minn., a corporation of Delaware No Drawing. Filed Jan. 22, 1964, Ser. No. 339,335

2 Claims. (Cl. 96—29)

This invention relates to sheet materials which may be visibly changed by exposure to light followed by heating at moderately elevated temperature.

Sheet materials of the invention have utility in the copying of graphic originals. As an example, copies of photographic transparencies are made by first exposing the copy-sheet through the transparency to actinic light, e.g. from a tungsten filament projection lamp or a mercury arc ultraviolet lamp, and then heating the thus partially exposed copy-sheet in an oven or between heated glass plates at 140–150° C., whereupon a permanent visible change occurs in the light-struck areas.

For purposes of illustration the sheet material may conveniently take the form of an opaque or non-transparent coating of porous blushed lacquer on a thin flexible backing. The blushed lacquer coating obscures the backing, which may be either transparent or opaque and of a contrasting color. Exposure to actinic light followed by heating as just described transparentizes the opaque blushed coating and exposes the supporting backing, or the supporting surface, to view.

Heat-sensitive copy-sheets have previously been known in which an opaque blushed lacquer coating is transparentized by heat or other agency to produce a visible change. The effect may be due to compaction of a soft coherent blushed coating, or to fusion of the blushed lacquer, or to fusion of waxy or other fusible particles contained within a blushed coating of non-fusing binder, or perhaps to other causes. In all instances, the temperature required to cause transparentization of the blushed coating remains at least as high after exposure to actinic light.

It has now been found that a significant and substantial decrease in the transparentization temperature of an opaque or non-transparent porous blushed lacquer layer on exposure of said layer to actinic light may be accomplished by incorporating with the film-forming polymeric organic lacquer or binder a significant small proportion of a light-decomposable progenitor of an organic plasticizer for said binder. Exemplary plasticizer progenitors are such photosensitive diazo compounds as p-anilinobenzene diazonium sulfate and p-diazo-2,5-dibutoxy benzoylaniline zinc chloride double salt.

In its preferred embodiment the copy-sheet of the present invention therefore comprises a supporting substrate or carrier and an initially opaque and porous binder layer which on exposure to a light-image and to moderately elevated temperature is selectively transparentized at the light-struck areas.

The preparation of blushed lacquer coatings is well known and as usually practiced involves applying a thin coating of film-forming organic polymer from solution in a mixture of a volatile liquid solvent and a less readily volatile liquid which is a non-solvent for the polymer. During evaporation the concentration of the non-solvent increases to a point at which the polymer becomes at least partially insoluble and precipitates in the form of a porous and visibly opaque or non-transparent layer of interconnected flakes or particles. Water may serve as a non-solvent liquid and may be present in the original solution or may be introduced subsequently, for example by evaporation of a water-miscible volatile solvent in an atmosphere of high relative humidity. Mixtures of liquid organic solvents and non-solvents may also be used. The particular volatile organic liquids to be employed will obviously be determined by the particular film-forming polymer as well as other components of the coating composition.

As hereinbefore noted the photosensitive plasticizer progenitor compound decomposes, under the influence of actinic radiation, to a plasticizer for the specific binder employed. The remaining products of decomposition may include volatile materials, which then escape from the porous coating, or non-volatile materials which remain as inert components. As an example, the photodecomposition of a diazo progenitor material may result in liberation of nitrogen, which then escapes from the porous binder stratum, as well as inorganic salt residues, e.g. zinc salts, which are retained in the binder layer but in such small proportions as to have virtually no influence on the appearance of the product.

It is found that surprisingly small proportions of the photosensitive plasticizer progenitor produce inordinately large effects on the temperature susceptibility of the plasticizable polymeric binder. As an example, p-diazo-2,5-dimethoxy-1-p-toluylmercaptobenzene zinc chloride double salt is combined with ten times its weight of unplasticized ethyl cellulose in acetone containing a small amount of water. The combination is applied to a transparent thin film backing as a thin blush coating which, prior to irradiation, remains unchanged under prolonged heating at 150° C. After exposure for one-quarter minute to radiation from a BH–6 high pressure mercury vapor ultraviolet lamp at a distance of seven inches, the light-struck areas of the coating are found to be capable of becoming completely transparent on heating briefly to 140–150° C. as by momentary contact with a metal test bar or plate at that temperature.

Smaller as well as larger proportions of plasticizer progenitors are useful, depending on such variables as the particular materials employed, the degree of clarity or transparency desired, the presence or absence of modifiers, and the temperature differential required. In all cases the amount of plasticizer progenitor must be sufficient to provide an effective degree of plasticization of the binder to permit a visible change in the copy-sheet while being insufficient to mask or otherwise obscure such change.

The development of a photo-induced plasticizing effect may be employed to advantage in copy-sheet structures other than those based on transparentizable blush coatings. Heat-sensitive copy-sheets comprising layers of mutually reactive color-forming components separated by an intervening thin heat-fusible film layer represent one such structure. The incorporation of a photodecomposable plasticizer progenitor makes possible a reduction in the fusion temperature of the separating layer by exposure of the sheet to actinic radiation. Controlled heating of the sheet then results in fusion of the separating layer and inter-reaction between the reactant layers at the light-struck areas while the remaining areas remain unaffected. In still another copy-sheet structure the photodecomposable plasticizer progenitor is supplied as a thin film or coating separate from the heat-sensitive sheet material containing the plasticizable film-forming polymer, the film is exposed to a light-image, and the thus liberated plasticizer material is then transferred from the film to the heat-sensitive sheet in the pattern of the light-image. The visible record is then developed by controlled heating. It will be apparent that the latter system provides a convenient means for determining the effectiveness of a specific combination of film-forming material and photosensitive plasticizer progenitor as well as providing an alternative form of copy-sheet product.

The following specific examples, in which all parts are by weight unless otherwise indicated, will serve further to illustrate but not to limit the invention.

Example 1

| | Parts |
|---|---|
| Ethyl cellulose ("Ethocel N-200") | 50 |
| p - Diazo - 2,5 - dibutoxybenzoylaniline zinc chloride double salt | 5 |
| Methanol | 360 |
| Water | 50 |

The structural formula of the photosensitive component is given as

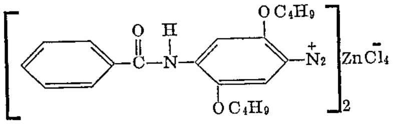

The binder and photosensitive diazo compound are dissolved in the mixture of methanol and water. The solution is coated on two mil (0.002 inch) clear transparent "Mylar" polyester film at a wet thickness of three mils, and permitted to dry. The dried coating is yellowish in color and has the soft-surfaced opaque appearance typical of blushed lacquer coatings.

A portion of the sheet is exposed for 15 seconds to a light-image from a BH-6 lamp at a distance of 7 inches and is then held in momentary contact with a smooth flat metal plate heated to 140–150° C. The light-struck areas immediately are transparentized, the remaining areas remaining opaque.

A second portion is exposed for 30 seconds to a light-image from a tungsten filament projection lamp through a photographic transparency, i.e. at a maximum intensity of 30,000 foot-candles, and then heated as in the previous instance. The light-struck areas are transparentized. The thus prepared copy serves as an effective projection transparency.

The coating is equally effective when applied to a color-coated or colored film or a metal foil as the carrier web.

Example 2

| | Parts |
|---|---|
| Ethyl cellulose ("Ethocel N-200") | 50 |
| p - Diazo - 2,5 - dimethoxy - 1 - p - toluylmercaptobenzene zinc chloride double salt | 5 |
| Acetone | 450 |
| Water | 50 |

The substituted aromatic organic diazo compound has the formula

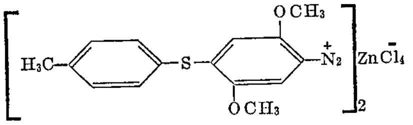

The solution is coated and dried as described in Example 1. The sheet is exposed to light from a BH-6 lamp at a distance of 7 inches applied through a photographic transparency and the light-struck areas then selectively transparentized by heating the entire sheet at 140° C. The resulting copy serves as a projection transparency.

Example 3

Films are provided with blush coatings of 50 parts of ethyl cellulose and varying amounts of p-anilinobenzenediazonium sulfate, having the formula

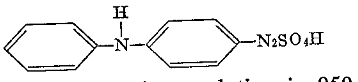

applied in each instance from solution in 950 parts of methanol and 100 parts of water, following the method out-lined in Example 1 except that the wet coating is applied at a coating orifice of two mils. The samples are exposed to a light pattern from a tungsten filament projection lamp through a patterned transparency and heated by pressing momentarily and smoothly, using a polytetrafluoroethylene film pressure pad, against a uniformly heated glass plate to transparentize the coatings selectively at the light-struck areas.

Copying ability is determined at varying concentration of diazo component by applying a light pattern having various numbers of lines per millimeter and determining, under optimum conditions of exposure and development, the maximum resolution, i.e. the maximum number of lines/mm. which are clearly reproduced.

| Concentration, binder:diazo | Exposure, Sec. | Development | | Resolution, lines/mm. |
|---|---|---|---|---|
| | | Temp., ° C. | Sec. | |
| 50:1 | 5 | 142 | 5 | 37 |
| 50:3 | 2½ | 143 | 10 | 60 |
| 50:7 | 5 | 142 | 15 | 95 |

At the highest concentration the diazonium salt is not completely compatible with the blushed lacquer, the coating containing visibly distinguishable crystals of the salt. At the lowest concentration the resolution is reduced, the visible distinction between image and background areas is less pronounced, and closer control of development conditions is required.

Example 4

| | Parts |
|---|---|
| Cellulose acetate butyrate | 50 |
| 4-diazo-2,5-dimethoxy phenylacetylaniline zinc chloride double salt | 3 |
| Acetone | 950 |
| Water | 20 |

The formula of the diazo compound is

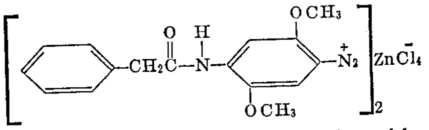

The solution is coated on polyester film with a knife coater at an orifice of two mils, and dried, to provide an opaque blushed coating. The sheet is exposed to a light-pattern as described in Example 3 for a time of 2½ seconds, and the latent image developed by heating for a few seconds at 160° C. The copy is useful as a projection transparency.

Example 5

A solution of p-diazo-2,5-dimethoxy-1-(4'-toluyl)-mercaptobenzene zinc chloride double salt is uniformly coated on a polyester film and dried, forming a foggy-appearing yellowish coating.

A solution of ethyl cellulose in acetone containing a little water is separately coated on polyester film and dried under conditions suitable for the formation of a strongly opalescent thin white blushed coating. Heating at 140–150° C. does not transparentize the coating.

The yellowish film is exposed over part of its area to light from the BH-6 lamp under conditions as described in Example 1, and is then placed with the coated surface in close contact with the white blushed coating and the composite heated for a short time, in this instance for ten seconds at 120° C. The yellow sheet is then removed and the white sheet re-heated for a few seconds at 140° C. The areas corresponding to the light-struck areas of the yellow sheet become transparent; the other areas remain strongly opalescent and visibly unchanged. Essentially the same result is obtained by heating the composite at 140° C. prior to separation of the two sheets. Substitution of the 4-diazo-2,5-dibutoxy benzoylaniline zinc chloride double salt as used in Example 1 as the photodecomposable plasticizer progenitor produces essentially the same result.

Polystyrene, polyethylmethacrylate, polyvinyl acetate and partially hydrolyzed vinyl acetate-vinyl chloride copolymer are exemplary of other polymeric thermoplastic film-forming binder materials which, either along or in conjunction with various modifiers, have also been found to produce acceptable heat-resistant opaque blushed coatings and to be adequately plasticizable for the purposes of the invention, although ethyl cellulose appears to be somewhat superior to the others named in both respects and is presently preferred. Mixtures of binder are also useful.

There has thus been provided a new and unique copy-sheet product and a method of making the same, whereby permanent visible records of light-images may be produced quickly, simply and economically by exposure to the light-image followed by brief heating at controlled moderately elevated temperature, the resulting copy in a presently preferred form having particular utility as a projection transparency reproduction, for example of a valuable or restricted-use photographic transparency original.

What is claimed is as follows:

1. Method of copying comprising: exposing to a light-pattern a copy-sheet having a photosensitive layer including a plasticizable film-forming thermoplastic non-water-soluble polymeric organic binder material and in intimate association therewith a photodecomposable organic progenitor of a plasticizer therefor, the exposure being sufficient to decompose said progenitor and liberate said plasticizer; and then heating said copy-sheet to cause fusion of the binder material only at the thus plasticized areas such that a visible image is formed.

2. Method of copying on a copy-sheet having a thin uniform non-transparent surface layer comprising a plasticizable film-forming thermoplastic non-water-soluble polymeric organic binder material in porous blush form, comprising: exposing to a light-pattern a sheet material having a surface layer of a photodecomposable organic progenitor of a plasticizer for said binder material, the exposure being sufficient to decompose said progenitor and liberate said plasticizer; and then heating said sheet material with its said surface layer in contact with the surface layer of said copy-sheet to cause plasticization and reduction in fusion temperature of said binder material by said plasticizer such that a visible image is formed in the copy-sheet on further heating.

References Cited

UNITED STATES PATENTS

| | | | |
|---|---|---|---|
| 1,983,005 | 12/1934 | Sakurai | 96—91 |
| 2,215,739 | 9/1940 | Leuch | 96—91 |
| 2,405,523 | 8/1946 | Sease et al. | 96—75 |
| 2,996,381 | 8/1961 | Oster et al. | 96—49 |
| 3,014,301 | 12/1961 | Grupe | 117—36.7 XR |
| 3,016,298 | 1/1962 | Sanders et al. | 96—75 |
| 3,057,999 | 9/1962 | Newman et al. | 117—36.7 XR |
| 3,060,023 | 9/1962 | Burg et al. | 96—115 XR |
| 3,090,697 | 5/1963 | Lawton et al. | 117—36.7 |
| 3,111,407 | 11/1963 | Lindquist et al. | 96—49 XR |
| 3,113,022 | 12/1963 | Cassiers et al. | 96—115 XR |
| 3,202,510 | 8/1965 | Hollmann | 96—75 |
| 3,218,168 | 11/1965 | Workman | 96—85 |
| 3,228,785 | 1/1966 | Growald et al. | 117—36.7 |
| 3,272,629 | 9/1966 | Hills | 96—75 |

NORMAN G. TORCHIN, *Primary Examiner.*

C. L. BOWERS, *Assistant Examiner.*